United States Patent [19]

Abe

[11] 4,193,595

[45] Mar. 18, 1980

[54] RHYTHMIC EXERCISING APPARATUS

[75] Inventor: Seiji Abe, Oume, Japan

[73] Assignee: Kabushiki Kaisha Nihon Kensho, Tokyo, Japan

[21] Appl. No.: 888,694

[22] Filed: Mar. 20, 1978

[30] Foreign Application Priority Data

Mar. 23, 1977 [JP] Japan .............................. 52-34283[U]

[51] Int. Cl.² ............................................... A63F 9/00
[52] U.S. Cl. ...................................... 273/1 R; 272/93
[58] Field of Search ............... 35/29 C; 273/1 A, 100, 273/106 B, 105 R, 105 A, 1 G, 1 R, 84, 288; 272/93

[56]  References Cited

U.S. PATENT DOCUMENTS

| | | | |
|---|---|---|---|
| 1,489,550 | 4/1924 | Shaffer | 273/106 B |
| 1,513,968 | 11/1924 | Crandall | 273/106 B |
| 1,547,273 | 7/1925 | Trayers | 273/100 |
| 1,662,278 | 3/1928 | Nelson | 273/106 B |
| 1,815,443 | 7/1931 | Mitchell | 35/29 C |
| 2,158,475 | 5/1939 | Montine | 35/29 C |
| 2,506,932 | 5/1950 | McAfee | 273/106 B |
| 2,891,793 | 6/1959 | Mudry | 272/93 X |
| 3,115,340 | 12/1963 | Stasiuk | 273/1 A |
| 3,823,942 | 7/1974 | Duncan | 273/100 |
| 3,879,034 | 4/1975 | Petrusek | 273/1 R |
| 3,977,678 | 8/1976 | Hedberg | 273/100 |
| 4,079,939 | 3/1978 | Raistakka | 273/105 R |

Primary Examiner—Richard J. Johnson
Attorney, Agent, or Firm—Haseltine, Lake & Waters

[57] ABSTRACT

A rhythmic exercising apparatus formed of an annular body with a hole large enough to receive a foot therethrough and being provided with an index orientation member integral therewith for directing the position of the apparatus with respect to the travel of the user. The lower surface of the body is provided with grooves or ridges to prevent it from sliding. The annular body is also formed to minimize braking by tensile forces acting thereon through provision of a cut or slit therein.

3 Claims, 6 Drawing Figures

RHYTHMIC EXERCISING APPARATUS

BACKGROUND OF THE INVENTION

The present invention relates to a rhythmic exercising apparatus for training in a rhythmic sense.

A rhythmic sense gives rise to a basis for various kinds of sporting activities. In order to properly train and develop a proper sense of rhythm, mostly dance type of conditioning is required where a player dances to music. However, there are disadvantages to this approach, in that the rhythmic sense necessary for such physical exercise, as for example jumping or the like, gives rise to a tightening of one's muscles which cannot be trained.

DISCUSSION OF INVENTION

The main object of the invention is to provide an apparatus for training a rhythmic sense suitable for sports.

The principal feature of the present invention is directed to a rhythmic exercising apparatus including: an annular body formed with a hole sufficient to receive a foot; an index member internal of said body to provide means for defining an orientation of said body; gripping means provided at the undersurface of said body to permit positive gripping with a substrate and slit means formed of said annular body to minimize tensile forces acting thereon.

Other objects and advantages of the present invention will best be understood with respect to the accompanying specification, claims and drawings.

IN THE DRAWINGS

DESCRIPTION OF THE INVENTION

Figure 1:
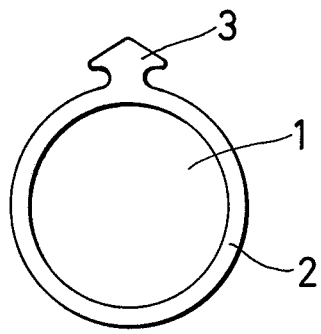
FIG. 1 is a top plan view of one embodying example of the present invention.
Figure 2:
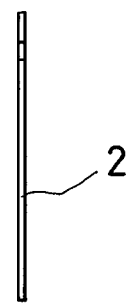
FIG. 2 is a right side view of FIG. 1.

The present invention as shown in FIG. 1 is characterized by an annular body 2 having a hole portion 1 which is large enough to receive at least one foot and is provided on its outside with an index member 3 for indicating a given direction that the index member 3 may project integrally from the annular member 2.

Figure 3:
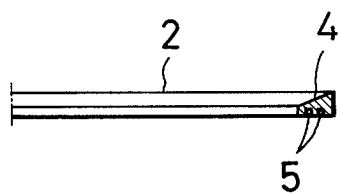
FIG. 3 is a sectional view of part of another embodiment of the invention.
Figure 4:
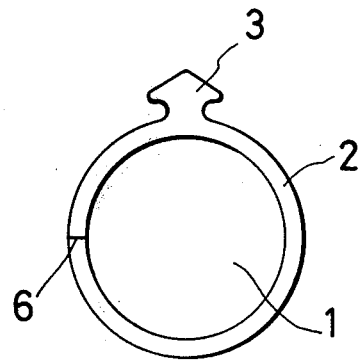
FIG. 4 is a top plan view of another embodiment of the invention where annular bodies are provided with cut-off portions.
Figure 5:
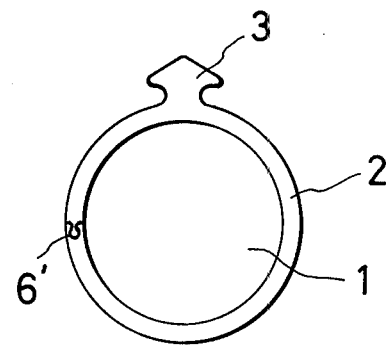
FIG. 5 is a top view of still another embodiment of the invention where annular bodies are provided with cut-off portion.

The annular body 2 may be rectangular, square, oval or the like in shape, but it is preferable from the viewpoint of use, that the same is circular in shape and the sectional shape thereof may be uniformly a flat rectangular one or a trapezoidal of which the upper surface 4 is slant as shown in FIG. 3. The upper surface or the lower surface of the annular body 2 may be provided with grooves 5 or ridges to prevent it from sliding. The annular body 2 is provided with a slit portion 6 or a connectable and disconnectable portion 6' as shown in FIGS. 4 and 5. This prevents the body 2 from breaking by a tensile force acting thereon. The index member 3 may be an arrow in shape.

This invention apparatus is used in the manner as explained below.

Figure 6:
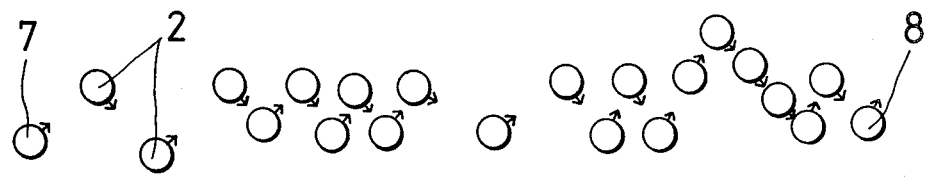
FIG. 6 is a top plan view illustrating how the invention is being employed.

A designated number of the same are disposed on an earth surface or a floor surface so as to be formed in serial order as directed by the index members 3 shown in FIG. 6. A player moves in order from a start position 7 to a goal 8 according to the direction of the respective index members 3. While hopping over the hole portions 1 one after another with one foot or with two feet. Where the annular members 2 are arranged in a zig-zag form and the intervals therebetween are varied as shown in FIG. 6, for instance, it causes the player's body to automatically move rhythmically and as a result, swiftness and tactfullness can be acquired from his experience. The indication of hopping with one foot or with two feet may be given by differentiating the colors of the annular bodies from each other.

Thus, according to this invention, the annular body 2 has a hole portion 1 large enough to receive at least one foot, the body 2 is so provided on the outside thereof with the index member 3 for indicating a given direction that the index member may project integrally therefrom. It follows that if a proper number of the same are disposed as desired on a floor surface or the like, and the player moves in hopping manner while placing his foot or feet in the hole portions 1 according to the directions of their index members 3, a rhythmic sense suitable for sports can be acquired. This can be changed into various formations simply by changing the form of arrangements of the annular bodies and the directions of the index members as desired.

Many modifications and variations of the present invention are possible in light of the above teachings. It is, therefore, to be understood that within the scope of the appended claims, the invention may be practiced otherwise than as particularly described.

I claim:

1. A rhythmic exercising apparatus used by being placed on a floor, including: an annular body circular in shape formed with a hole sufficient to receive a foot; an index member shaped as an arrow, integral of said body to provide means for defining an orientation of said body; said annular body and index member being rectangular and flat in cross-section.

2. An apparatus as claimed in claim 1, wherein: gripping means being provided at the undersurface of said body to permit positive gripping with a substrate; and slit means formed of said annular body to minimize tensile forces acting thereon.

3. An apparatus as claimed in claim 1, wherein: said apparatus is 40 cm in outer diameter, said annular body being about 2 cm in width and about 0.3 cm in diameter.

* * * * *